(12) United States Patent
Yu et al.

(10) Patent No.: US 9,880,334 B2
(45) Date of Patent: Jan. 30, 2018

(54) OPTICAL FILM, LIQUID CRYSTAL DISPLAY DEVICE COMPRISING SAME, AND METHOD FOR MANUFACTURING PROTECTIVE FILM USED THEREFOR

(71) Applicant: SAMSUNG SDI CO., LTD., Yongin-si, Gyeonggi-do (KR)

(72) Inventors: So Hee Yu, Suwon-si (KR); Ran Kim, Suwon-si (KR); Seung Kyu Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/316,115

(22) PCT Filed: Dec. 15, 2014

(86) PCT No.: PCT/KR2014/012332
§ 371 (c)(1),
(2) Date: Dec. 2, 2016

(87) PCT Pub. No.: WO2015/186880
PCT Pub. Date: Dec. 10, 2015

(65) Prior Publication Data
US 2017/0108632 A1 Apr. 20, 2017

(30) Foreign Application Priority Data
Jun. 2, 2014 (KR) .................. 10-2014-0066927

(51) Int. Cl.
*G02B 5/30* (2006.01)
*C08J 5/18* (2006.01)
(Continued)

(52) U.S. Cl.
CPC .............. *G02B 5/3083* (2013.01); *C08J 5/18* (2013.01); *G02B 1/14* (2015.01); *G02F 1/13363* (2013.01);
(Continued)

(58) Field of Classification Search
CPC .. G02B 5/3083; G02B 1/14; C08J 5/18; C08J 2367/02; G02F 1/13363; G02F 1/133528;
(Continued)

(56) References Cited

U.S. PATENT DOCUMENTS

2007/0222926 A1* 9/2007 Chang .................. G02B 5/3083
349/117
2007/0236636 A1* 10/2007 Watson ................ G02B 6/0056
349/117
(Continued)

FOREIGN PATENT DOCUMENTS

JP 2005-345990 A 12/2005
KR 10-0877926 B1 1/2009
(Continued)

OTHER PUBLICATIONS

Machine translation of document D1 on SN 15316115.*
(Continued)

*Primary Examiner* — Joseph L Williams
*Assistant Examiner* — Jose M Diaz
(74) *Attorney, Agent, or Firm* — Lewis Roca Rothgerber Christie LLP

(57) ABSTRACT

An optical film, a liquid crystal display including the same, and a method for manufacturing a protective film used therefor are provided. An optical film includes a polarizer and a protective film laminated or stacked on at least one surface of the polarizer, and a thickness-direction retardation (Re) of the protective film is in the range of 0 nm to 200 nm,
(Continued)

and an out-of-plane retardation (Rth) of the protective film is in the range of 300 nm to 1,200 nm.

14 Claims, 2 Drawing Sheets

(51) Int. Cl.
    *G02F 1/1335*     (2006.01)
    *G02F 1/13363*     (2006.01)
    *G02B 1/14*     (2015.01)

(52) U.S. Cl.
    CPC ..... *G02F 1/133528* (2013.01); *C08J 2367/02* (2013.01); *G02F 2001/133507* (2013.01); *G02F 2001/133562* (2013.01); *G02F 2001/133567* (2013.01); *G02F 2201/50* (2013.01)

(58) Field of Classification Search
    CPC ........ G02F 2001/133507; G02F 2001/133567; G02F 2001/133562; G02F 2201/50
    See application file for complete search history.

(56) References Cited

U.S. PATENT DOCUMENTS

| | | |
|---|---|---|
| 2010/0157205 A1 | 6/2010 | Kiya et al. |
| 2011/0268895 A1 | 11/2011 | Jung et al. |
| 2014/0168579 A1* | 6/2014 | Kim ................ G02B 5/3033 349/96 |
| 2014/0293197 A1* | 10/2014 | Shin ................ G02B 5/3083 349/96 |

FOREIGN PATENT DOCUMENTS

| | | |
|---|---|---|
| KR | 10-2010-0138222 A | 12/2010 |
| KR | 10-2013-0019001 A | 2/2013 |

OTHER PUBLICATIONS

International Search Report and Written Opinion for corresponding PCT Application No. PCT/KR2014/012332 dated Mar. 12, 2015, with English translation (19 pages).

* cited by examiner

【FIG. 1】
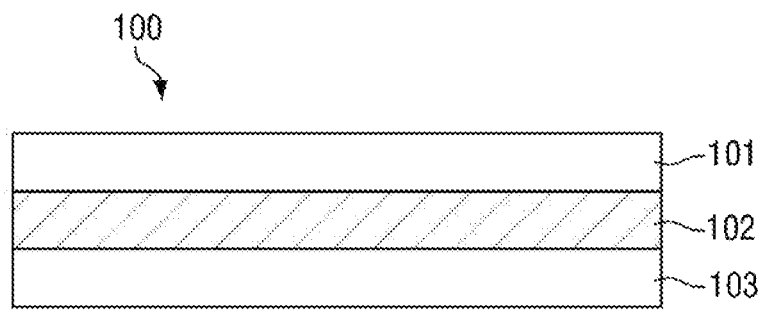
【FIG. 2】
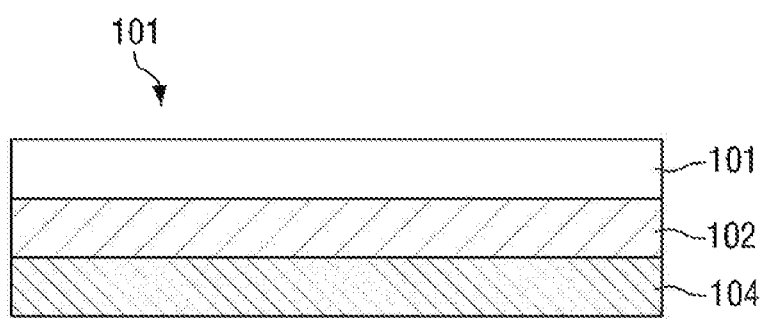
【FIG. 3】
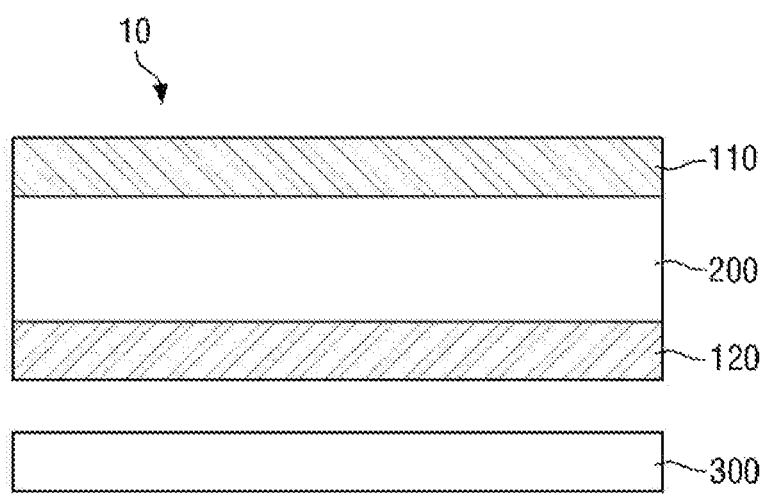

【FIG. 4】
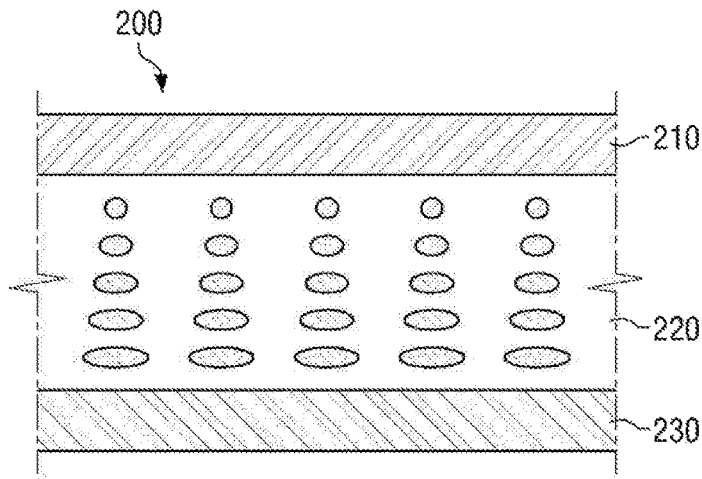
【FIG. 5】
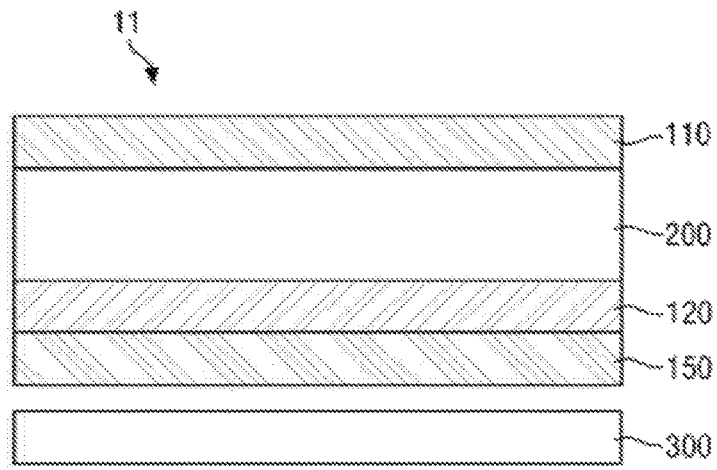
【FIG. 6】
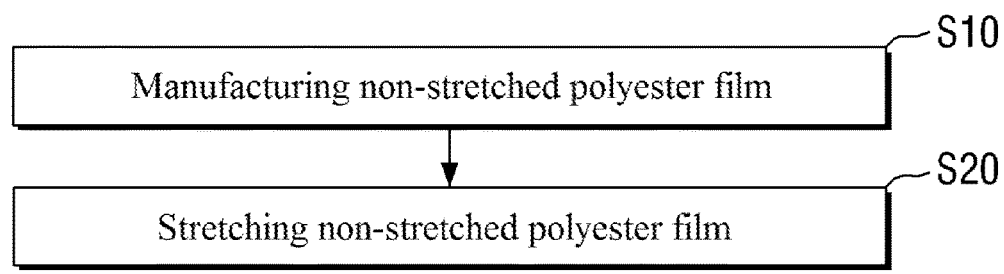

OPTICAL FILM, LIQUID CRYSTAL DISPLAY DEVICE COMPRISING SAME, AND METHOD FOR MANUFACTURING PROTECTIVE FILM USED THEREFOR

CROSS-REFERENCE TO RELATED APPLICATIONS

This Application is a National Phase Patent Application and claims priority to and the benefit of International Application Number PCT/KR2014/012332, filed on Dec. 15, 2014, which claims priority to and the benefit of Korean Application No. 10-2014-0066927, filed on Jun. 2, 2014, the entire contents of both of which are incorporated herein by reference.

BACKGROUND

1. Field

Aspects of embodiments of the present invention relate to an optical film, a liquid crystal display including the same, and a method of manufacturing a protective film used therefor.

2. Description of the Related Art

Recently, with the rapid development of display applications, various flat panel displays exhibiting excellent properties such as lower thickness, lighter weight and lower power consumption are developed and replace existing cathode ray tubes (CRTs).

Examples of flat panel displays may include liquid crystal displays (LCDs), plasma display panels (PDPs), field emission displays (FEDs), organic electroluminescent devices, and the like.

Among flat panel displays, a liquid crystal display is one of flat panel displays currently most widely used. Generally, a liquid crystal display has a structure in which a liquid crystal layer is sealed between a thin film transistor (TFT) array substrate and a color filter substrate.

However, since an optical film including a polarizer and a protective film is used for a liquid crystal display and allows rainbow stains to be visible due to birefringence of the protective film, the liquid crystal display has a problem of low visibility.

SUMMARY

According to aspects of embodiments of the present invention, an optical film is capable of preventing or reducing rainbow stains, and a liquid crystal display including the optical film is provided. According to another aspect of embodiments of the present invention a method of manufacturing the optical film with ease is provided.

According to another aspect of embodiments of the present invention, an optical film is capable of preventing or reducing rainbow stains visible from a side surface thereof even though a liquid crystal display includes a brightness enhancement film, and a liquid crystal display including the optical film is provided.

The above and other aspects of the present invention will become apparent to those skilled in the art from the detailed description of the following embodiments in conjunction with the accompanying drawings.

In accordance with one or more embodiments of the present invention, an optical film includes a polarizer and a protective film stacked on at least one surface of the polarizer, wherein the protective film has an in-plane retardation (Re) of 0 nm to 200 nm and an out-of-plane retardation (Rth) of 300 nm to 1,200 nm.

The protective film may have a thickness of 1 μm to 55 μm.

The protective film may include a polyester material.

The protective film may include polyethylene terephthalate, polyethylene naphthalate, or a copolymer including polyethylene terephthalate and polyethylene naphthalate.

The protective film may have a triple co-extrusion structure which includes polyethylene terephthalate, polyethylene naphthalate, or a copolymer including polyethylene terephthalate and polyethylene naphthalate.

The optical film may further include a retardation compensation film stacked on an opposite surface of the polarizer with respect to the at least one surface of the polarizer, on which the protective film is stacked.

In accordance with one or more embodiments of the present invention, a liquid crystal display includes: a liquid crystal cell; a backlight unit; a lower polarizing plate disposed between the liquid crystal cell and the backlight unit; and an upper polarizing plate disposed at a visible side of the liquid crystal cell, wherein the upper polarizing plate may include the optical film described above.

The protective film of the optical film may be disposed on a visible side of the upper polarizing plate, wherein the protective film has an in-plane retardation (Re) of 0 nm to 200 nm and an out-of-plane retardation (Rth) of 300 nm to 1,200 nm.

The liquid crystal display may further include a brightness enhancement film disposed between the lower polarizing plate and the backlight unit.

The lower polarizing plate may include the optical film described above.

The protective film of the optical film of the lower polarizing plate may be disposed on a light source side of the lower polarizing plate, wherein the protective film has an in-plane retardation (Re) of 0 nm to 200 nm and an out-of-plane retardation (Rth) of 300 nm to 1,200 nm.

The protective film of the optical film of the upper polarizing plate may be disposed on a visible side of the upper polarizing plate, wherein the protective film has an in-plane retardation (Re) of 0 nm to 200 nm and an out-of-plane retardation (Rth) of 300 nm to 1,200 nm.

The liquid crystal display may further include a brightness enhancement film disposed between the lower polarizing plate and the backlight unit.

In accordance with one or more embodiments of the present invention, a method of manufacturing a protective film may include: manufacturing a non-stretched polyester film; and stretching the non-stretched polyester film, wherein a stretching ratio (MD:TD) may be in a range from 2.0:1.0 to 3.0 to 3.0:2.0 to 4.0.

Further details of other embodiments will be described in the detailed description with reference to the accompanying drawings.

According to one or more aspects, embodiments of the present invention provide at least the following effects.

That is, the optical film according to embodiments of the present invention can prevent or reduce rainbow stains when applied to a liquid crystal display and thus improve visibility of a liquid crystal display.

In addition, even though a liquid crystal display may include a brightness enhancement film, the optical film according to the present invention can prevent or reduce rainbow stains visible from the side thereof and thus improve visibility of the liquid crystal display.

It should be understood that advantageous effects according to embodiments of the present invention are not limited to the effects set forth above and that other advantageous effects of embodiments of the present invention will be apparent from the following description of some embodiments of the present invention.

BRIEF DESCRIPTION OF THE DRAWINGS

FIG. 1 is a schematic sectional view of an optical film according to an embodiment of the present invention.

FIG. 2 is a schematic sectional view of an optical film according to another embodiment of the present invention.

FIG. 3 is a schematic sectional view of a liquid crystal display according to an embodiment of the present invention.

FIG. 4 is a schematic sectional view of a liquid crystal cell of a liquid crystal display according to an embodiment of the present invention.

FIG. 5 is a schematic sectional view of a liquid crystal display according to another embodiment of the present invention.

FIG. 6 is a schematic process flowchart of a method of manufacturing a protective film according to an embodiment of the present invention.

DETAILED DESCRIPTION

Some advantages and features of the present invention and methods of achieving the advantages and features will become apparent from the following description of some embodiments in conjunction with the accompanying drawings. However, it should be understood that the present invention is not limited to the following described embodiments and may be embodied in different ways, and that the embodiments are provided for complete disclosure and thorough understanding of the invention by those skilled in the art. The scope of the present invention should be defined, rather, by the accompanying claims and equivalents thereof.

It should be understood that, when an element or layer is referred to as being placed "on" another element or layer, it can be directly placed on the other element or layer, or intervening element(s) or layer(s) may also be present. Like components will be denoted by like reference numerals throughout the specification.

It should be understood that, although terms such as "first," "second," and the like may be used herein to describe various components, these components are not limited by these terms. Rather, these terms are used only to distinguish one component from another component. Therefore, a first component could be termed a second component without departing from the scope and spirit of the present invention.

In addition, it should be understood that, unless operations included in a manufacturing method described herein are specified as being sequential or consecutive or otherwise stated, one operation and another operation included in the manufacturing method should not be construed as being limited to an order described herein. Therefore, it should be understood that an order of operations included in a manufacturing method can be changed within the range of understanding of those skilled in the art, and that, in this case, the incidental changes obvious to those skilled in the art are within the scope of the present invention.

Optical Film

An optical film according to an embodiment of the present invention will be described with reference to FIG. 1. FIG. 1 is a schematic sectional view of an optical film according to an embodiment of the present invention.

Referring to FIG. 1, an optical film 100 according to an embodiment of the present invention may include a first protective film 101 and a second protective film 103, which are placed at both surfaces of the optical film 100 in a thickness direction thereof, and a polarizer 102 interposed between the first protective film 101 and the second protective film 103.

In one embodiment, an adhesive 104 (e.g., only the adhesive 104) may be used without the second protective film 103, as shown in FIG. 2, or without the first protective film 101.

In one embodiment, although not shown in the drawings, the optical film may include a retardation compensation film stacked on an opposite surface of the polarizer with respect to a surface of the polarizer on which the protective film is stacked. Alternatively, the retardation compensation film may be stacked on one surface of a stacked body in which the protective films are stacked on both surfaces of the polarizer, and disposition of the retardation compensation film may be variously changed depending upon a method typically used in the art.

At least one of the first and second protective films 101, 103 may have an in-plane retardation (Re) of 0 nm to 200 nm and an out-of-plane retardation (Rth) of 300 nm to 1,200 nm. Here, disposition of the protective film having retardations within the ranges as set forth above on an upper side of a display may be useful to prevent or substantially prevent rainbow stains.

When the thickness of each of the protective films 101, 103, an index of refraction thereof in an in-plane slow axis direction, an index of refraction thereof in an in-plane fast axis direction, and an index of refraction thereof in a thickness direction are defined as d, nx, ny, and nz, respectively, the in-plane retardation (Re) and the out-of-plane retardation (Rth) may be defined by the following equations, respectively.

$$Re = (nx-ny) \times d$$

$$Rth = ((nx+ny)/2 - nz) \times d$$

In addition, the retardation values may be defined as absolute values corresponding to positive numbers.

The slow axis may be defined as a direction maximizing an in-plane index of refraction of each of the protective films 101, 103, and the fast axis may be defined as a direction perpendicular to the slow axis in the plane.

Generally, assuming that the fast axis of each of the protective films 101, 103 is $\ominus r$ and an absorption axis of the polarizer is $\ominus p$, if a value of $\ominus r$-p is not 90 or 0, that is, if the slow axis (r) of each of the protective films 101, 103 is not perpendicular (90) or parallel (0) to the absorption axis (p) of the polarizer, rainbow stains are visible to the eye due to retardation birefringence. When the protective film according to the present invention is placed at one end in a visible direction, the protective film is not affected by the value of $\ominus r$-p and allows rainbow stains not to be visible.

In one embodiment, due to the reasons as described above, each of the protective films 101, 103 may have an in-plane retardation (Re) of 0 nm to 200 nm, and, in one embodiment, 30 nm to 150 nm, and, in one embodiment, 45 nm to 80 nm. In addition, each of the protective films 101, 103 may have an out-of-plane retardation (Rth) of 300 nm to 1,200 nm, and, in one embodiment, 800 nm to 1100 nm. Within this range, visibility of rainbow mura can be further reduced.

The polarizer 102 is a film capable of converting natural light or polarized light into arbitrary polarized light, generally specific linearly polarized light. The polarizer 102 may include polarizers obtained by adsorbing iodine or a dichroic material such as dichroic dyes onto a hydrophilic polymer film such as a polyvinyl alcohol film, a partially formalized polyvinyl alcohol film, or a partially saponified ethylene-vinyl acetate copolymer film, followed by stretching the hydrophilic polymer film; oriented polyene films such as products obtained by dehydration of polyvinyl alcohols and products obtained by de-hydrochloric acid treatment of polyvinyl chloride, and the like, without being limited thereto. In one embodiment, the polarizer 102 may include an iodine-containing polyvinyl alcohol film, which may have a high degree of polarization and exhibits good adhesion to the protective films 101, 103, without being limited thereto.

The first protective film 101 and/or the second protective film 103 having the retardations set forth above may include a polyester material.

The polyester material may include, for example, dicarboxylic acids such as terephthalic acid, isophthalic acid, o-phthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydrophthalic acid, hexahydroisophthalic acid, malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acids, sebacic acid, suberic acid, and dodecadicarboxylic acid; and diols such as ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, and bis(4-hydroxyphenyl)sulfone, without being limited thereto. The polyester material may include homopolymers obtained by polycondensation of one of the materials as set forth above, copolymers obtained by polycondensation of at least one dicarboxylic acid and at least two diols, copolymers obtained by polycondensation of at least two dicarboxylic acids and at least one diol, and polyester resins obtained by blending at least two of these homopolymers and copolymers.

In one embodiment, the polyester material may include aromatic polyesters, whereby the polyester material exhibits crystallinity, for example, polyethylene terephthalate (PET), polyethylene naphthalate (PEN), or a copolymer including the same, without being limited thereto.

In addition, the protective films 101, 103 may have a triple co-extrusion structure which includes polyethylene terephthalate, polyethylene naphthalate, or a copolymer including these materials.

A polyester film may be obtained, for example, by a method in which a polyester resin as set forth above is melt-extruded in a film shape and then cooled and solidified using a casting drum to form a film. According to the present invention, a stretched polyester film, and, in one embodiment, a biaxially stretched polyester film, may be appropriately used in that the properties as set forth above are achieved by imparting crystallinity to the polyester film. In addition, when the first protective film is mainly composed of an aromatic polyester resin, the film may further include resins other than the aromatic polyester resin, additives, and the like.

When one of the protective films 101, 103 does not have a retardation value within the range as set forth above, the corresponding protective film 101 or 103 may be an optically isotropic protective film substantially having no birefringence, or a protective film having extremely low retardation or excellent in-plane uniformity in an optical axis direction despite birefringence. Materials having such properties may include a transparent polymer having uniform optical properties and an amorphous polymer in terms of transparency, without being limited thereto. For example, the materials having such properties may include cellulose, cyclic polyolefin (norbornene), polycarbonate, polyacrylate, amorphous polyester, polyvinyl alcohol, polysulfone, and polyimide resins, without being limited thereto.

When the protective films 101, 103 are stretched films, a stretching method is not particularly limited and may include longitudinal uniaxial stretching, transverse uniaxial stretching, longitudinal-transverse successive biaxial stretching, longitudinal-transverse simultaneous biaxial stretching, and/or the like. In one embodiment, the stretching method may be simultaneous biaxial stretching, without being limited thereto. A stretching means may include any of appropriate stretching machines, such as roll stretching machines, tenter stretching machines, and pantograph-type or linear motor-type biaxial stretching machines.

Although the first protective film or the second protective film may have any thickness so long as the first protective film 101 or the second protective film 102 has retardation properties as set forth above, the first protective film or the second protective film may have a thickness of 1 µm to 55 µm for thickness reduction. In one embodiment, the first protective film or the second protective film may have a thickness of 10 µm to 50 µm, without being limited thereto.

Liquid Crystal Display

FIG. 3 is a schematic sectional view of a liquid crystal display according to an embodiment of the present invention; and FIG. 4 is a schematic sectional view of a liquid crystal cell included in the liquid crystal display.

Referring to FIGS. 3 and 4 in conjunction with FIG. 1, a liquid crystal display 10 may include a liquid crystal cell 200, a backlight unit 300, a lower polarizing plate 120 disposed between the liquid crystal cell 200 and the backlight unit 300, and an upper polarizing plate 110 disposed on a visible side of the liquid crystal cell 200.

The liquid crystal cell 200 may include a liquid crystal panel including a first substrate 210, a second substrate 230, and a liquid crystal layer 220 sealed between the first substrate 210 and the second substrate 230, and the upper polarizing plate 110 may be stacked on one surface (e.g., an upper surface) of the first substrate 210. The upper polarizing plate 110 may include the optical film 100 according to the present invention. In one embodiment, a protective film having a specific retardation as set forth above may be disposed on an upper surface thereof, that is, a visible side of the upper polarizing plate 110.

The lower polarizing plate 120 may also be stacked on a lower surface of the second substrate 230, and when the two polarizing plates 110, 120 are placed on upper and lower surfaces of the liquid crystal cell 200, respectively, transmission axes of polarizers of the polarizing plates may be perpendicular or parallel to each other. In one embodiment, the lower polarizing plate 120 may also include the optical film 100 according to the present invention, and in this case, a protective film having a specific retardation as set forth above may be disposed on a lower surface thereof, that is, a light source side of the lower polarizing plate 120.

The first substrate 210 may be a color filter (CF) substrate. Although not shown in detail in FIG. 4, the first substrate 210 may include, for example, a black matrix for preventing or substantially preventing light leakage, red, green, and blue color filters, and a common electrode, which is formed of a transparent conductive oxide such as ITO or IZO and corresponds to an electric field generating electrode, on a lower surface of a base including a transparent insulating material such as glass or plastic.

The second substrate 230 may be a thin film transistor (TFT) substrate. Although not shown in detail in FIG. 4, the second substrate 230 may include a thin film transistor, which includes a gate electrode, a gate insulating film, a semiconductor layer, a resistive contact layer and source/drain electrodes, and a pixel electrode, which is formed of a transparent conductive oxide such as ITO or IZO and corresponds to an electric field generating electrode, on a base including a transparent insulating material such as glass or plastic.

A plastic substrate capable of being used for the first substrate 210 and the second substrate 230 may include any of plastic substrates, such as polyethylene terephthalate (PET), polycarbonate (PC), polyimide (PI), polyethylene naphthalate (PEN), polyether sulfone (PES), polyarylate (PAR) and cycloolefin copolymer (COC) substrates, which can be used for displays, without being limited thereto. In addition, the first substrate 210 and the second substrate 230 may include a flexible material.

The liquid crystal layer 220 may be a twisted nematic (TN) liquid crystal layer, vertical alignment (VA) liquid crystal layer, horizontal alignment (IPS or FFS) liquid crystal layer, or the like, which has positive dielectric anisotropy. In FIG. 4, one example of a TN mode liquid crystal layer is illustrated.

When an electric field is not applied to the liquid crystal layer 220 due to no voltage difference between the pixel electrode and the common electrode, that is, the electric field generating electrodes, major axes of liquid crystals of the liquid crystal layer 220 are arranged parallel to surfaces of the first substrate 210 and the second substrate 230, and the liquid crystals of the liquid crystal layer 220 have a spirally 90° twisted structure from the first substrate 210 to the second substrate 230.

Polarization of linearly polarized light is changed by retardation due to anisotropy of indices of refraction of the liquid crystals as the linearly polarized light passes through the liquid crystal layer 220. A linear polarization direction of the light passing through the liquid crystal layer 220 may be rotated by 90° by adjusting dielectric anisotropy (AO) or chiral pitch of the liquid crystals, a thickness of the liquid crystal layer 220, that is, a cell gap, or the like.

The backlight unit 300 may generally include a light source, a light guide plate, a reflective film, and the like. Backlight units may be divided into direct type, side light type, sheet-light source type backlight units, and the like, depending upon configurations thereof.

FIG. 5 is a schematic sectional view of a liquid crystal display according to another embodiment of the present invention.

Referring to FIG. 5, a liquid crystal display 11 according to this embodiment may further include a brightness enhancement film 150 disposed between the lower polarizing plate 120 and the backlight unit 300 in addition to the components of the liquid crystal display 10 shown in FIG. 4.

Typically, in a structure wherein a brightness enhancement film is disposed between a lower polarizing plate and a backlight unit 300, visibility of rainbow mura can be increased when a liquid crystal display is viewed from the side thereof. Therefore, as described herein, the protective film having a specific retardation according to the present invention is applied to the upper polarizing plate 110 or the lower polarizing plate 120, thereby reducing visibility of rainbow mura from the side of the liquid crystal display 11.

More specifically, the protective film having a specific retardation as set forth above is disposed on the upper surface of the upper polarizing plate 110, that is, the visible side of the upper polarizing plate 110, on the lower surface of, that is, the light source side of the lower polarizing plate 120, or on both the upper surface of the upper polarizing plate 110 and the lower surface of the lower polarizing plate 120, whereby visibility of rainbow mura from the side of the liquid crystal display 11 can be reduced even though the brightness enhancement film 150 is used.

Method of Manufacturing Protective Film

FIG. 6 is a schematic process flowchart of a method of manufacturing a protective film according to an embodiment of the present invention.

Referring to FIG. 6 in conjunction with FIG. 1, a method of manufacturing protective films, such as the protective films 101, 103 described above, includes: manufacturing a non-stretched polyester film (S10); and stretching the non-stretched polyester film (S20).

Operation S10 of manufacturing the non-stretched polyester film may be performed, for example, using melt extrusion, without being limited thereto. A polyester material is melted at a melting temperature thereof or higher, followed by ejecting the polyester material from an extruder, thereby forming a non-stretched film. One example in which operation S10 is performed using melt extrusion will be described in further detail.

Since orange peel-like bubble defects can occur if moisture content in a raw material is greater than a certain level in melt extrusion, the moisture content in the raw material needs to be managed at the certain level or less. A dryer may include, for example, a dehumidifying dryer and/or a hot-air dryer, without being limited thereto. Drying may be performed at a temperature of less than a glass transition temperature of a raw material of a film. However, the drying temperature may be appropriately selected depending upon kind and glass transition temperature of a resin in use. If the drying temperature is too low, there are no drying effects, and if the drying temperature is too high, the drying temperature causes change in properties of the raw material and thus is not appropriate. Drying time of the raw material may be in a range from 0.5 hours to 5 hours and may be selected by considering ambient humidity or the like.

The dried raw material may be supplied to a raw material storage (e.g., a hopper) placed at an extruder entrance. In some cases, in order to remove impurities which can be included in the raw material, first, the raw material may pass through a filter while air is circulated in the storage.

The introduced raw material fills a first section of a screw in the extruder. The first section serves to transfer the raw material to a cylinder of the extruder.

Next, in a second section, melting of the raw material starts and it is desirable that the temperature of the second section be set to the glass transition temperature of the raw material or higher.

A third section serves to completely convert the raw material into a melt, and the temperature of the third section may be maintained in the same range as that of the second section.

A fourth section serves to secure a stable eject amount of the melt by increasing the density of the melt through increase in pressure with respect to the melt. In this process, the temperature of the fourth section may also be maintained in the same range as those of second and third sections such that the ejected melt is not cured.

In some cases, the melt is allowed to pass through a gear pump section transferring a constant amount of the melt to a T-die. If the raw material is directly transferred to the T-die through the screw in the cylinder of the extruder, an amount (e.g., an instantaneous amount) of the transferred raw material becomes irregular, thereby making it difficult to obtain a high-quality product. Therefore, a gear pump stores the raw material, which is irregularly transferred from the cylinder of the extruder, in a certain space and then stably supplies a constant amount of the melt to the T-die, thereby minimizing or reducing a change in pressure distribution.

A section to which the melt is finally ejected from the extruder is a T-die section. The shape and thickness of a film is determined depending upon the shape of the T-die. The shape of the T-die may include a "T" shape, a coat hanger shape, and a fish tail shape, without being limited thereto. The kind of T-die may be selected depending upon flowability of the melt, and the like.

Operation S20 may be performed using general wet stretching and/or dry stretching in the art.

Examples of dry stretching may include inter-roll stretching, heating roll stretching, compression stretching, tenter stretching, and the like, and examples of wet stretching may include tenter stretching, inter-roll stretching, and the like.

Wet stretching may be performed in alcohol, water, or an aqueous solution of boric acid using a solvent, such as methyl alcohol and isopropyl alcohol, without being limited thereto.

In addition, operation S20 may be performed by longitudinal uniaxial stretching, transverse uniaxial stretching, longitudinal-transverse successive biaxial stretching, longitudinal-transverse simultaneous biaxial stretching, or the like.

In one embodiment, in order to allow the protective film to have a retardation value as set forth above, biaxial stretching or simultaneous biaxial stretching may be used, without being limited thereto.

Although a stretching ratio (MD:TD) in operation S20 of stretching may vary depending upon a desired thickness range and is not particularly limited, the stretching ratio (MD:TD) may range, for example, from 2.0:1.0 to 3.0 to 3.0:2.0 to 4.0. That is, a TD stretching ratio may be set in the range of ±1.0 times an MD stretching ratio. Here, the MD stretching ratio may range from 2.0 times to 3.0 times.

Although the present invention has been described with reference to some embodiments in conjunction with the accompanying drawings, it should be understood that various modifications, changes, alterations, and equivalent embodiments can be made by those skilled in the art without departing from the spirit and scope of the invention. Therefore, it should be understood that the foregoing embodiments are provided for illustration only and are not to be construed in any way as limiting the present invention.

EXAMPLES

Hereinafter, the optical film and the liquid crystal display according to the present invention will be described in further detail with reference to preparative examples and experimental examples.

Preparative Example 1 to 14 and Comparative Examples 1 to 13

Protective films having thicknesses, in-plane retardations (Re) and out-of-plane retardations (Rth) as listed in Table 1 were prepared using polyethylene terephthalate through melt extrusion and simultaneous biaxial stretching, and optical films were prepared by bonding the protective films to iodine-containing polyvinyl alcohol polarizers.

The in-plane retardation (Re) and the out-of-plane retardation (Rth) may be defined by Equations 1 and 2, respectively, and the retardation values may be defined as absolute values.

$$Re = (nx - ny) \times d \qquad \text{Equation (1)}$$

$$Rth = ((nx + ny)/2 - nz) \times d \qquad \text{Equation (2)},$$

where nx is an index of refraction of the protective film in an in-plane slow axis direction; ny is an index of refraction of the protective film in an in-plane fast axis direction; nz is an index of refraction of the protective film in a thickness direction; and d is a thickness of the protective film. In addition, the slow axis may be defined as a direction allowing an in-plane index of refraction of the protective film to become a maximum value, and the fast axis may be defined as a direction perpendicular to the slow axis in the plane.

Measurement of the in-plane retardations (Re) and the out-of-plane retardations (Rth) was performed at 23° C. at a wavelength of 550 nm using a retardation measurement system (AxoScan, Axometrics Inc.). In addition, a degree of a measurement value of retardation was determined to coincide with pre-calculated wavelength dispersion of a retardation value of a polyester film.

Experimental Example 1

Visibility of rainbow stains from the side of each of the optical films prepared in Preparative Example 1 to 14 and Comparative Examples 1 to 13 was investigated in each of the following cases: when the optical film was applied to upper and lower polarizing plates without a brightness enhancement film (case A); when the brightness enhancement film was applied between a liquid crystal cell and a backlight unit and the optical film was applied only to the upper polarizing plate (case B); and when the brightness enhancement film was applied between the liquid crystal cell and the backlight unit and the optical film was applied to the upper and lower polarizing plates (case C), with reference to the liquid crystal cell. Results are shown in Table 1.

TABLE 1

| (unit: parts by weight) | | | | | |
|---|---|---|---|---|---|
| | | | Visibility of rainbow stains from side | | |
| Thickness | Re | Rth | A | B | C |
| [μm] | [nm] | [nm] | | | |
| Preparative Example 1 | | | | | |
| 45 | 100 | 1150 | LEVEL 0 | LEVEL 0 | LEVEL 1 |

TABLE 1-continued (unit: parts by weight)

| | Thickness [μm] | Re [nm] | Rth [nm] | Visibility of rainbow stains from side | | |
|---|---|---|---|---|---|---|
| | | | | A | B | C |
| Preparative Example 2 | 35 | 130 | 1030 | LEVEL 0 | LEVEL 0 | LEVEL 1 |
| Preparative Example 3 | 20 | 80 | 790 | LEVEL 0 | LEVEL 0 | LEVEL 1 |
| Preparative Example 4 | 20 | 80 | 730 | LEVEL 0 | LEVEL 0 | LEVEL 1 |
| Preparative Example 5 | 20 | 83 | 600 | LEVEL 0 | LEVEL 0 | LEVEL 1 |
| Preparative Example 6 | 20 | 75 | 650 | LEVEL 0 | LEVEL 0 | LEVEL 1 |
| Preparative Example 7 | 20 | 51 | 750 | LEVEL 0 | LEVEL 0 | LEVEL 1 |
| Preparative Example 8 | 20 | 46 | 830 | LEVEL 0 | LEVEL 0 | LEVEL 1 |
| Preparative Example 9 | 20 | 90 | 600 | LEVEL 0 | LEVEL 0 | LEVEL 1 |
| Preparative Example 10 | 20 | 85 | 550 | LEVEL 0 | LEVEL 0 | LEVEL 1 |
| Preparative Example 11 | 20 | 99 | 450 | LEVEL 0 | LEVEL 0 | LEVEL 1 |
| Preparative Example 12 | 23 | 75 | 700 | LEVEL 0 | LEVEL 0 | LEVEL 1 |
| Preparative Example 13 | 20 | 100 | 750 | LEVEL 0 | LEVEL 0 | LEVEL 1 |
| Preparative Example 14 | 15 | 110 | 350 | LEVEL 0 | LEVEL 0 | LEVEL 1 |
| Comparative Example 1 | 45 | 150 | 2350 | LEVEL 1 | LEVEL 1 | LEVEL 2 |
| Comparative Example 2 | 55 | 180 | 2250 | LEVEL 1 | LEVEL 1 | LEVEL 2 |
| Comparative Example 3 | 25 | 100 | 1500 | LEVEL 1 | LEVEL 1 | LEVEL 2 |
| Comparative Example 4 | 50 | 1608 | 7146 | LEVEL 2 | LEVEL 2 | LEVEL 2 |
| Comparative Example 5 | 80 | 8200 | 1,2000 | LEVEL 2 | LEVEL 2 | LEVEL 2 |
| Comparative Example 6 | 60 | 1800 | 7146 | LEVEL 2 | LEVEL 2 | LEVEL 2 |
| Comparative Example 7 | 50 | 1570 | 2300 | LEVEL 2 | LEVEL 2 | LEVEL 2 |
| Comparative Example 8 | 40 | 550 | 2000 | LEVEL 2 | LEVEL 2 | LEVEL 2 |
| Comparative Example 9 | 55 | 350 | 800 | LEVEL 2 | LEVEL 2 | LEVEL 2 |
| Comparative Example 10 | 40 | 150 | 3000 | LEVEL 2 | LEVEL 2 | LEVEL 2 |
| Comparative Example 11 | 25 | 100 | 2700 | LEVEL 2 | LEVEL 2 | LEVEL 2 |
| Comparative Example 12 | 25 | 80 | 2600 | LEVEL 2 | LEVEL 2 | LEVEL 2 |
| Comparative Example 13 | 30 | 190 | 3500 | LEVEL 2 | LEVEL 2 | LEVEL 2 |

A: When the optical films were applied to the upper and lower polarizing plates without the brightness enhancement film.

B: When the brightness enhancement film was applied between the liquid crystal cell and the backlight unit and the optical film was applied only to the upper polarizing plate.

C: When the brightness enhancement film was applied between the liquid crystal cell and the backlight unit and the optical film was applied to the upper and lower polarizing plates.

Level 0: Non-visibility of rainbow stains.

Level 1: Visibility of single color despite non-visibility of rainbow stains. Applicable level.

Level 2: Intermediate level or higher of visibility of rainbow stains. Inapplicable level.

In Table 1, it could be seen that, since the optical films of Comparative Examples 1 to 3 caused rainbow stains to be visible from the side thereof when the brightness enhancement film was applied between the liquid crystal cell and the backlight unit and the optical films were applied to the upper and lower polarizing plates (case C), the optical films of Comparative Examples 1 to 3 could not be applied to a liquid crystal display including the brightness enhancement film.

In particular, it could be seen that, since the optical films of Comparative Examples 4 to 13 caused rainbow stains to be visible from the side thereof in all of the following cases: when the optical films was applied to the upper and lower polarizing plates without use of the brightness enhancement film (case A); when the optical film was applied only to the upper polarizing plate while using the brightness enhancement film (case B); and when the optical films were applied to the upper and lower polarizing plates while using the brightness enhancement film (case C), the optical films of Comparative Examples 4 to 13 could not be applied to a liquid crystal display.

On the other hand, it could be confirmed that, since the optical films of Preparative Examples 1 to 14 did not cause rainbow stains to be visible although a single color was visible in some optical films, the optical films of Preparative Examples 1 to 14 could be applied to a liquid crystal display.

Therefore, it can be seen that, when used in a liquid crystal display, the optical film according to the present invention can prevent rainbow stains from being visible from the side of the liquid crystal display and can improve visibility of the liquid crystal display. In particular, it can be seen that, when used together with the brightness enhancement film, the optical film according to the present invention can extremely effectively improve visibility of the liquid crystal display by preventing rainbow stains from being visible from the side of the liquid crystal display due to polarization properties of the brightness enhancement film.

It should be understood that the foregoing embodiments are described for purposes of illustration only and that different embodiments can be applied, such as in combination.

The invention claimed is:

1. An optical film comprising:
    a polarizer; and
    a protective film on at least one surface of the polarizer, wherein the protective film has an in-plane retardation (Re) of 0 nm to 200 nm and an out-of-plane retardation (Rth) of 300 nm to 1,200 nm.

2. The optical film according to claim 1, wherein the protective film has a thickness of 1 μm to 55 μm.

3. The optical film according to claim 1, wherein the protective film comprises a polyester material.

4. The optical film according to claim 3, wherein the protective film comprises polyethylene terephthalate, polyethylene naphthalate, or a copolymer comprising polyethylene terephthalate and polyethylene naphthalate.

5. The optical film according to claim 4, wherein the protective film has a triple co-extrusion structure comprising polyethylene terephthalate, polyethylene naphthalate, or a copolymer comprising polyethylene terephthalate and polyethylene naphthalate.

6. The optical film according to claim 1, further comprising:
    a retardation compensation film on an opposite surface of the polarizer with respect to the at least one surface of the polarizer, on which the protective film is located.

7. A liquid crystal display comprising:
    a liquid crystal cell;
    a backlight unit;

a lower polarizing plate between the liquid crystal cell and the backlight unit; and an upper polarizing plate on a visible side of the liquid crystal cell, the upper polarizing plate comprising the optical film according to claim 1.

8. The liquid crystal display according to claim 7, wherein the protective film of the optical film is disposed on a visible side of the upper polarizing plate.

9. The liquid crystal display according to claim 8, further comprising:

a brightness enhancement film between the lower polarizing plate and the backlight unit.

10. The liquid crystal display according to claim 7, wherein the lower polarizing plate comprises an optical film comprising:

a polarizer; and a protective film on at least one surface of the polarizer of the optical film of the lower polarizing plate, wherein the protective film of the optical film of the lower polarizing plate has an in-plane retardation (Re) of 0 nm to 200 nm and an out-of-plane retardation (Rth) of 300 nm to 1,200 nm.

11. The liquid crystal display according to claim 10, wherein the protective film of the optical film of the lower polarizing plate is on a light source side of the lower polarizing plate.

12. The liquid crystal display according to claim 11, wherein the protective film of the optical film of the upper polarizing plate is on a visible side of the upper polarizing plate.

13. The liquid crystal display according to claim 12, further comprising:

a brightness enhancement film between the lower polarizing plate and the backlight unit.

14. A method of manufacturing a protective film, the method comprising:

manufacturing a non-stretched polyester film; and stretching the non-stretched polyester film, wherein a stretching ratio (MD:TD) is from 2.0:1.0 to 3.0 to 3.0:2.0 to 4.0.

* * * * *